United States Patent [19]

Ziegler et al.

[11] Patent Number: 4,553,999
[45] Date of Patent: Nov. 19, 1985

[54] METHODS AND APPARATUS FOR BLOW MOLDING GLASS ARTICLES

[75] Inventors: Michael J. Ziegler, Parma Heights; F. Richard Simpkins, Newbury, both of Ohio

[73] Assignee: AGA, A.B., Cleveland, Ohio

[21] Appl. No.: 600,410

[22] Filed: Apr. 16, 1984

[51] Int. Cl.[4] .............................. C03B 9/36; C03B 9/40
[52] U.S. Cl. .......................................... 65/84; 65/81; 65/85; 65/114
[58] Field of Search .................... 65/32, 74, 81, 84, 85, 65/137, 114

[56] References Cited

U.S. PATENT DOCUMENTS

| Re. 28,497 | 7/1975 | Gasmire ............................. 65/137 X |
| 1,653,848 | 12/1927 | Grotta . |
| 1,854,471 | 4/1932 | Hofmann . |
| 2,123,145 | 7/1938 | Peiler . |
| 3,236,620 | 2/1966 | Wiley . |
| 3,328,148 | 6/1967 | Belentepe et al. . |
| 3,350,189 | 10/1967 | Nowak ............................... 65/84 X |

FOREIGN PATENT DOCUMENTS 1005950  1/1952  France ................................ 65/114

OTHER PUBLICATIONS

*The Handbook of Glass Manufacture*, Fay V. Tooley, Editor, Books for Industry, Inc., New York, 1974, pp. 609-614 and 637-654.

*Primary Examiner*—Arthur Kellogg
*Attorney, Agent, or Firm*—David A. Burge

[57] ABSTRACT

Methods and apparatus for forming glass articles such as bottles and the like utilize flows of pressurized cold cryogen vapor that are introduced into mold cavities which are being used to mold glass articles. The cold cryogen vapor hastens cooling and solidification of the articles so that the time during which the articles must be retained in their molds is significantly reduced. Reductions in mold retention times enable the apparatus to be operated at increased speeds, whereby its productivity is significantly increased. Productivity increases of 15 percent and often more can be achieved at relatively low expense. The use of cold cryogen vapor introduction into mold cavities is applicable to a variety of glass molding techniques including molding and blow molding. Cold cryogen vapor introduction can be used in staged molding procedures, for example in operations where a hollow blank or parison of glass is first press-formed in a roughing mold, and is then blow-molded in a finishing mold to assume its final form; in such a staged procedure, cold cryogen vapor introduction may be used in either or both of the roughing and finishing stages to expedite solidification and to permit increased productivity. In preferred practice the cold cryogen vapor is nitrogen gas that is released from a container of liquid nitrogen. Cold cryogen vapor may be mixed with flows of cooling and/or blowing gases for delivery with these gases into mold cavities. In preferred practice, cold cryogen vapor is delivered into the mold cavities without being mixed with other flows of cooling and/or blowing gases.

16 Claims, 9 Drawing Figures

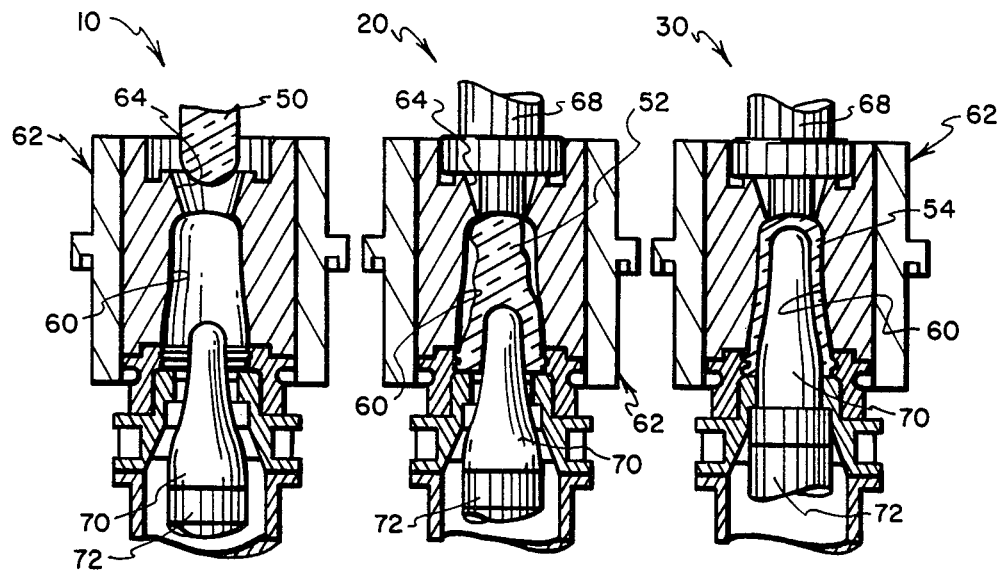
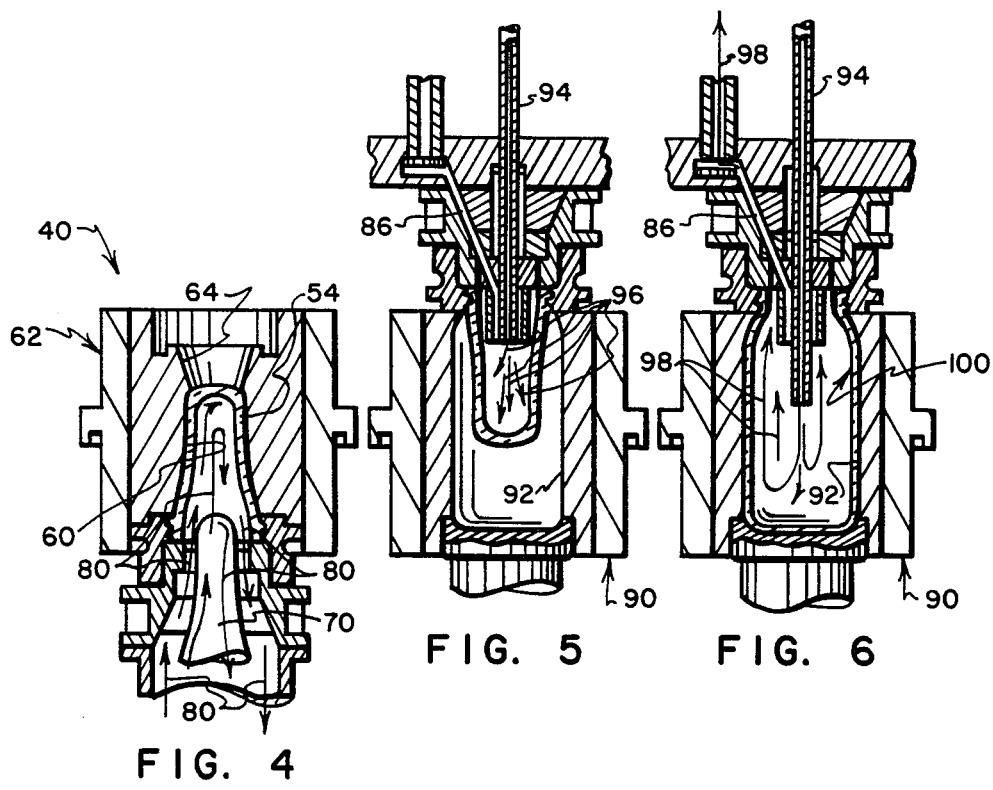

METHODS AND APPARATUS FOR BLOW MOLDING GLASS ARTICLES

BACKGROUND OF THE INVENTION

1. Field of the Invention

The present invention relates generally to the manufacture of glass articles such as bottles and the like, and more particularly, to methods and apparatus for permitting increased productivity in a glass manufacturing process by utilizing flows of pressurized cold cryogen vapor that are introduced into mold cavities to hasten the cooling and solidification of newly molded glass articles.

2. Prior Art

In the molding of glass articles such as bottles and the like, a hollow blank or parison of glass is typically formed in a roughing mold, and is inserted into a finishing mold where it is expanded to form an article of desired form. The hollow blank of glass is typically formed by pressing a gob of glass and/or by using a pressurized flow of ambient air as a blowing gas to conform the gob to a desired configuration. The resulting blank roughly approximates the shape of the final article that is to be molded, but has thicker walls and is smaller in size. The blank is expanded in the finishing mold to conform to a desired configuration as defined by the finishing mold. Expansion of the blank is typically effected by pressing and/or by using a pressurized flow of ambient air as a blowing gas.

In the molding of a preliminary article of glass such as a hollow blank or parison, and in the molding of articles of final form such as bottles, it is not uncommon to utilize flows of cooling gas that are directed toward the newly molded articles while the articles are still contained within their mold cavities to speed cooling and solidification of the articles so they can be removed as quickly as possible from their molds. The cooling gas is typically ambient air that has been pressurized by a blower. The cooling gas is typically fed from a manifold through a control valve and ducted into the mold cavities, with the gas having temperatures that lie within a range of about 90 to 100 degrees Fahrenheit, and sometimes higher. Where the articles being molded have been formed using blow-molding techniques, the blowing gas also typically comprises blower-pressurized ambient air that is ducted into the mold cavities at temperatures that lie within a range of about 90 to 100 degrees Fahrenheit, and sometimes higher. In most applications, the flows of cooling gases are uninterrupted extensions of the flows of blowing gases that are delivered into the mold cavities to blow-form articles therein.

In order to further speed the cooling of molded glass articles to diminish their mold retention times, proposals have been made to indirectly cool the articles by providing at least portions of their molds with cooling passages through which a fluid coolant is circulated. However, the degree to which mold cooling can be used to indirectly cool molded glass articles is limited not only by the tendency of this approach to induce defects (the number of defects induced in molded glass articles increases as mold temperatures are diminished), but also by the cost of forming cooling passages in the molds, and by the cost of providing suitable apparatus for maintaining controlled flows of coolant through the cooling passages.

While mold cooling does provide some assistance in diminishing mold retention times, the retention times during which newly molded glass articles must be held in their molds to effect proper solidification continue to form "bottlenecks" that obstruct efforts to increase the productivity of existing molding equipment.

SUMMARY OF THE INVENTION

The present invention overcomes the foregoing and other drawbacks of prior proposals by providing a novel and improved system which utilizes flows of pressurized cold cryogen vapor that are introduced into mold cavities to hasten solidification of glass articles which are being molded therein. In preferred practice, flows of pressurized cold cryogen vapor are also used as cooling gases to cool glass articles that are being molded, and as blowing gases to effect blow-molding of the articles.

By using cold cryogen vapor in this manner, mold retention times for molded glass articles are significantly reduced, thereby permitting correspondingly significant increases in productivity. Where cold cryogen vapor introduction is used in accordance with the preferred practice of the present invention, productivity increases of 15 percent and often more can be achieved at the relatively low expense that is associated with introducing flows of pressurized cold cryogen vapor into the paths of flow that have traditionally been utilized to duct blowing and/or cooling gases to the mold cavities. In preferred practice the cold cryogen vapor is nitrogen gas that is released from a container of liquid nitrogen, and the cold cryogen vapor provides cooling and/or blowing gases having temperatures at least as low as about 30 to 45 degrees Fahrenheit; much lower temperatures may be utilized if it is desired to enhance production rates dramatically.

The use of flows of cold cryogen vapor that are introduced into mold cavities is applicable to a variety of glass molding techniques including press molding and blow molding. Cold cryogen vapor introduction can be used in single stage molding procedures as well as in plural-stage molding procedures. In a single stage press-molding procedure, for example, a flow of cold cryogen gas may be introduced into a mold cavity to cool a press-molded article and to cool the plunger that has formed inner surface portions of the article. In a plural stage molding procedure, for example where a hollow blank or parison of glass is first press-formed in a roughing mold, and is then blow-molded in a finishing mold to assume its final form, flows of pressurized cold cryogen vapor may be introduced into the mold cavities in either or both of the roughing and finishing stages to expedite solidification and to permit increased productivity.

In accordance with the preferred practice of the present invention, cold cryogen vapor is introduced into the flow paths that are traditionally followed by blowing and/or cooling gases in being ducted into mold cavities. In order to minimize cryogen vapor loss, and in order to maximize the cooling effect of the cryogen vapor, the cryogen vapor is preferably introduced into these flow paths at locations which are in very close proximity to the mold cavities.

BRIEF DESCRIPTION OF THE DRAWINGS

Other features and a fuller understanding of the invention may be had by referring to the following description and claims, taken in conjunction with the accompanying drawings, wherein:

FIGS. 1 through 4 are schematic side elevational views, partially in cross-section, illustrating sequential steps in the press-forming and cooling of a preliminary glass article, namely a hollow blank or parison of glass;

FIGS. 5 and 6 are schematic side elevational views illustrating sequential steps wherein the hollow blank or parison of glass that is formed in the process depicted by FIGS. 1-4 is blow-molded and cooled in a finishing mold to complete the molding of the final form of a glass article such as a bottle;

DESCRIPTION OF THE PREFERRED EMBODIMENT

Figure 7:
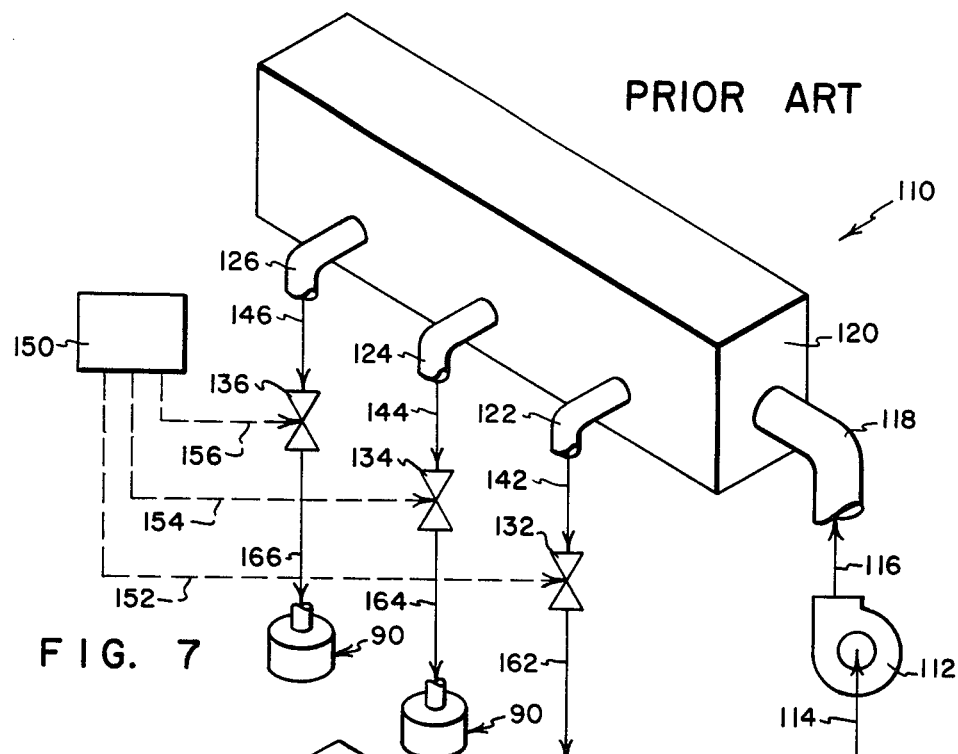
FIG. 7 is a schematic diagram of a gas supply system of the type conventionally used to supply blow-molding and/or cooling gases to mold cavities for use in blow-molding and/or cooling glass articles that are being molded.

Referring to FIGS. 1 through 4, four work stations of a glass blank molding apparatus are indicated generally by the numerals 10, 20, 30, 40. The work stations 10, 20, 30, 40 are utilized herein to depict a conventional series of sequential steps that are carried out by automated glass molding machinery to press-form a gob of glass, indicated by the numeral 50 in FIG. 1, to form an article of intermediate configuration, indicated by the numeral 52 in FIG. 2, and thence a hollow blank or parison of glass, indicated by the numeral 54 in FIGS. 3 and 4. In the sequence of steps depicted by FIGS. 1-4, the gob 50 is introduced into a mold cavity 60 of a mold assembly 62 through an open upper end 64, as illustrated in FIG. 1. When the gob 50 is in place in the mold cavity 60, the open upper end 64 is closed by an upper plunger 68, and a mold core 70 is pressed into the cavity 60 by a lower plunger 72, as is illustrated in FIG. 2. Insertion of the mold core 70 is continued until the modified formation of the gob 50, as indicated by the numeral 52 in FIG. 2, has been conformed to the shape of the mold cavity 60, whereby the hollow blank or parison 54 of FIG. 3 is formed. The mold core 70 is then withdrawn, as depicted in FIG. 4, so that flows of cooling gases, as indicated by arrows 80, can be directed into and through the mold cavity 60 to cool the newly formed hollow blank or parison 54.

As soon as the hollow blank or parison 54 has cooled (i.e., solidified) sufficiently to render it stable for transport and inversion, a conventional apparatus (not shown) for transporting and inverting the blank 54 is used to move the blank 54 to a finishing mold assembly 90, as depicted in FIG. 5. The blank 54 is inserted into a mold cavity 92 defined by the mold assembly 90. Blow-molding gases are ducted into the hollow interior of the blank 54 through a blow tube 94, as is conventional, to effect expansion of the blank 54 to conform its shape to that of the cavity 92. The flow of blow-molding gas into the blank 54 is indicated in FIG. 5 by arrows 96. As the blow-molding gas 96 continues to be supplied to the interior of the bank 54, the blank 54 is expanded, whereby a glass article such as the bottle 100 is formed, as depicted in FIG. 6. Once the bottle 100 has been formed in the mold assembly 90, a flow of cooling gas, indicated by arrows 98 in FIG. 6, is established through the interior of the bottle 100 by introducing the cooling gas 98 through the blow tube 94, and by discharging the cooling gas 98 through one or more valve-controlled passages 86 that are formed in the mold assembly 90. In most applications, the blowing gas 96 and the cooling gas 98 are supplied as an uninterrupted, continuous flow of the same gaseous medium.

Referring to FIG. 7, a conventional system for supplying flows of blow-molding gases and/or cooling gases is indicated generally by the numeral 110. The system 110 includes a blower 112 for receiving ambient air, as indicated by an arrow 114, and for compressing the ambient air 114 to form a pressurized supply of ambient air, as indicated by an arrow 116. The compressed air 116 is fed through a supply conduit 118 to a pressurized air manifold 120. The manifold 120 acts as a reservoir of pressurized air, and as a source for supplying pressurized air to conduits such as those indicated by the numerals 122, 124, 126. The conduits 122, 124, 126 duct pressurized air to control valves 132, 134, 136, as is indicated by arrows 142, 144, 146. The valves 132, 134, 136 operate in response to electrical or pneumatic signals 152, 154, 156 which are received from a control unit 150 to duct pressurized air, as indicated by arrows 162, 164, 166, to mold assemblies such as the previously described mold assemblies 62, 90. The flows of pressurized air that are indicated schematically by the arrows 162, 164, 166 in FIG. 7 may represent supplies of blowing and/or cooling gases, such as is indicated by the arrows 80, 96 and 98 in FIGS. 4, 5 and 6, respectively.

As will be readily apparent to those skilled in the art, the apparatus and molding techniques described with reference to FIGS. 1-7 are conventional in nature and represent a manner in which glass articles such as bottles and the like are commonly blow-molded in automatic molding machinery. The apparatus depicted in FIGS. 1-7 is typical of such apparatus as may advantageously employ features of the present invention.

Figure 8:
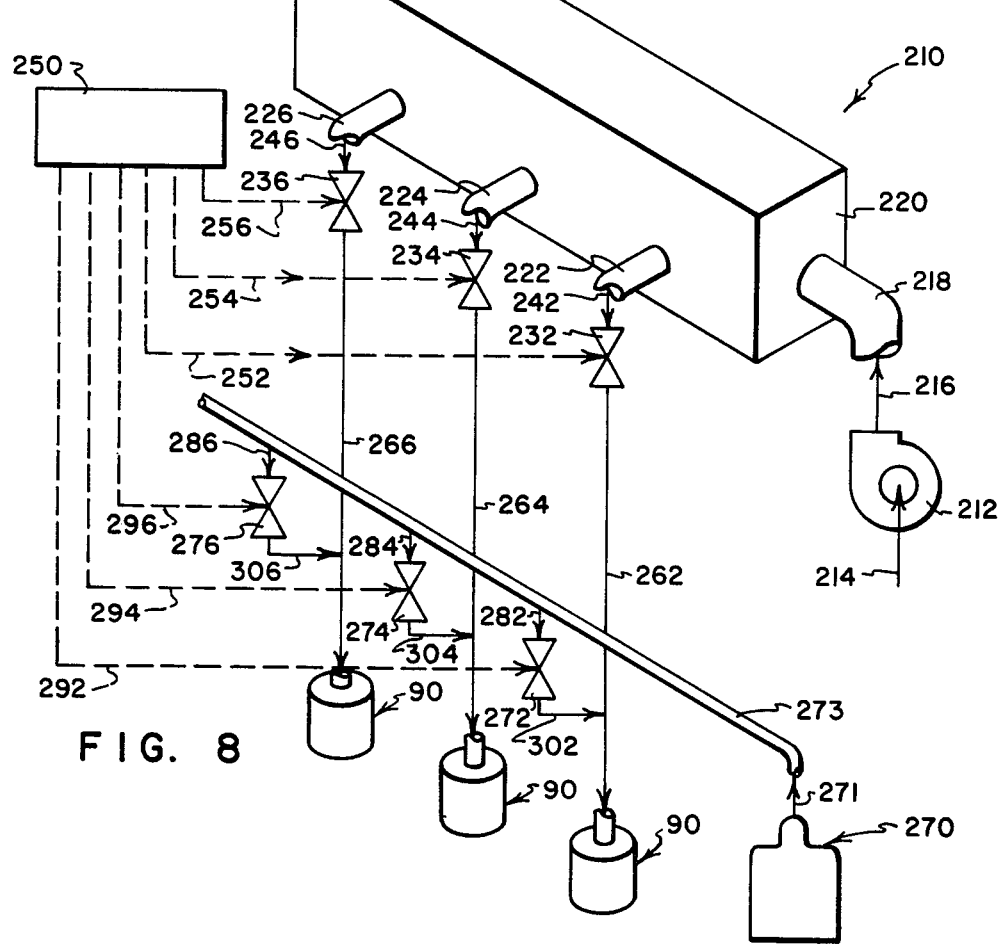
FIG. 8 is a schematic diagram of a substitute gas supply system that incorporates features of the preferred practice of the present invention; and, FIG. 9 is a schematic diagram of a less preferred gas supply system that incorporates features of the present invention.

In accordance with the preferred practice of the present invention, such conventional gas supply systems 110 as are depicted in FIG. 7 preferably are replaced by more sophisticated gas supply systems of the type indicated generally by the numeral 210 in FIG. 8. One or more of the systems 210 operates to supply blowing gases and/or cooling gases, as indicated by the arrows 80, 96 and 98 in FIGS. 4, 5 and 6, respectively, to the apparatus illustrated in FIGS. 1-6.

Referring to FIG. 8, the system 210 includes a blower 212 for receiving ambient air, as indicated by an arrow 214, and for compressing the ambient air 214 to form a pressurized supply of ambient air, as indicated by an arrow 216. The compressed air 216 is fed through a supply conduit 218 to a pressurized air manifold 220. The manifold 220 acts as a reservoir of pressurized air, and as a source for supplying pressurized air to conduits such as those indicated by the numerals 222, 224, 226. The conduits 222, 224, 226 duct pressurized air to control valves 232, 234, 236, as is indicated by arrows 242, 244, 246. The valves 232, 234, 236 operate in response to electrical or pneumatic signals 252, 254, 256 which are received from a control unit 250 to duct pressurized air, as indicated by arrows 262, 264, 266, to mold assemblies such as the previously described mold assemblies 62, 90. The flows of pressurized air that are indicated schematically by the arrows 262, 264, 266 in FIG. 8 may represent supplies of blowing and/or cooling gases, such as is indicated by the arrows 80, 96 and 98 in FIGS. 4, 5 and 6, respectively.

The system 210 further includes a source of pressurized cold cryogen vapor, as indicated generally by the numeral 270, for supplying pressurized cold cryogen vapor, as indicated by an arrow 271, to a conduit or "header" 273. Cold cryogen vapor is ducted from the header 273 to control valves 272, 274, 276, as is indicated by arrows 282, 284, 286. The valves 272, 274, 276 respond to electrical or pneumatic signals, as indicated by arrows 292, 294, 296, from the control unit 250. When the valves 272, 274, 276, are operated to permit the passage of pressurized cold cryogen vapor therethrough, the vapor is delivered into the flow lines 262, 264, 266 which feed into the molds 90, as indicated by arrows 302, 304, 306.

The control unit 250 operates to generate signals 252, 254, 256 and 292, 294, 296 which effect openings and closings of the valves 232, 234, 236 and 272, 274, 276 so that cold cryogen vapor is delivered into the cavities of the molds 90 at the most opportune times and for appropriate lengths of time to efficiently and expeditiously effect cooling (i.e., solidification) of articles therein.

A typical blowing of a hollow blank or parison 54 in one of the mold assemblies 90 to form a large volume (e.g. two liter) bottle 100 can be carried out in accordance with the preferred practice of the present invention using about a 1 second flow of ambient air into the mold assembly 90 to conform the hot glass to the final molded configuration of the bottle 100, with the air having a temperature of about 90–100 degrees Fahrenheit, and followed by a flow of cold cryogen vapor at about −20 degrees Fahrenheit for about 2 seconds to provide a flow of cooling gas that will expedite solidification of the molten glass. The temperature and duration of the cryogen vapor flow can be adjusted to optimize cryogen usage for a selected rate of bottle production.

Figure 9:
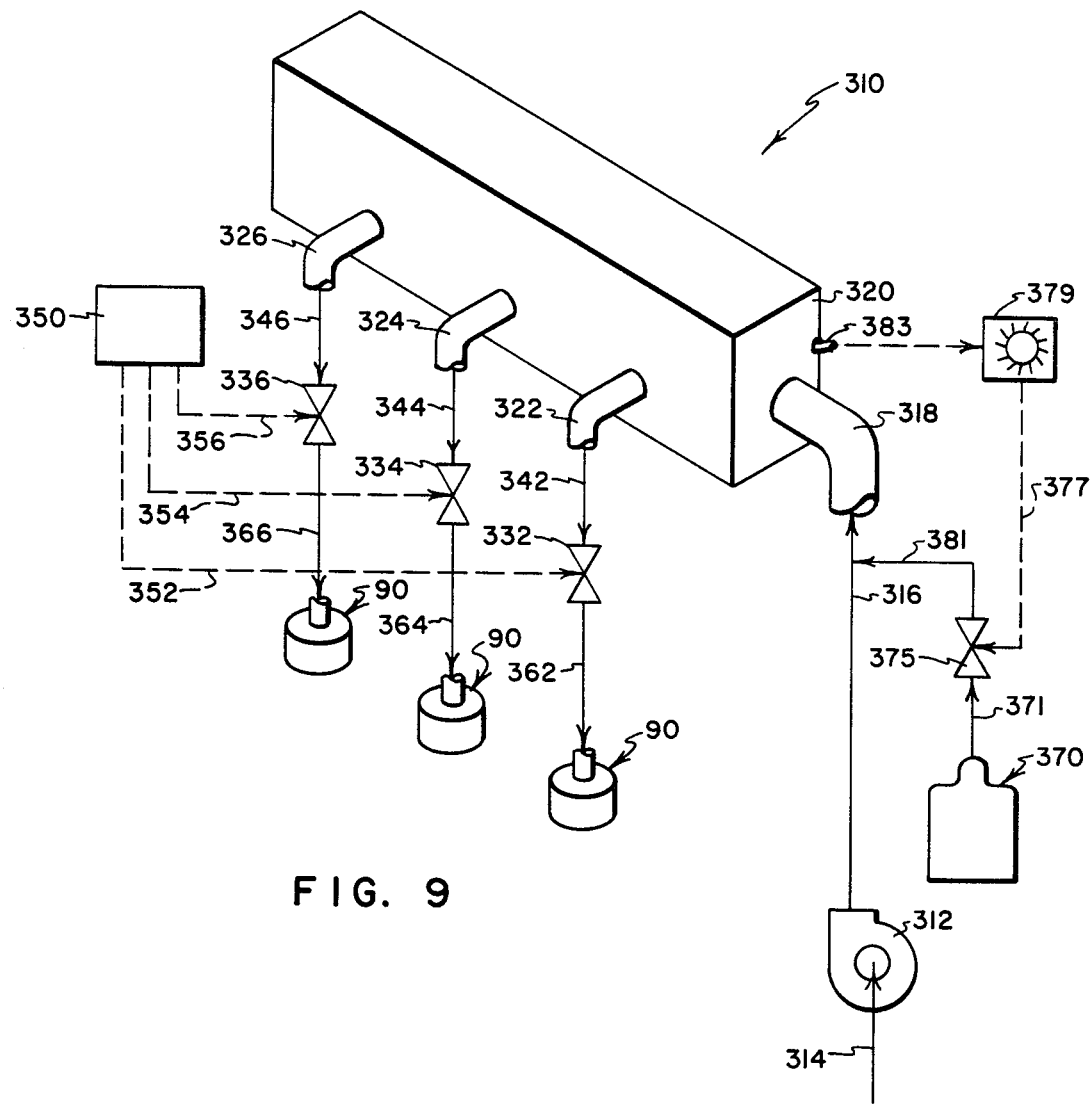

Referring to FIG. 9, a less preferred practice of the present invention is depicted in conjunction with a gas supply system 310. The system 310 includes a blower 312 for receiving ambient air, as indicated by an arrow 314, and for compressing the ambient air 314 to form a pressurized supply of ambient air, as indicated by an arrow 316. A source of pressurized cold cryogen vapor, as indicated generally by the numeral 370, is provided for supplying cold cryogen vapor to a control valve 375, as is indicated by an arrow 371. The control valve 375 operates in response to an electrical or pneumatic signal 377 from a control unit 379 to duct pressurized cold cryogen vapor (indicated by an arrow 381) into the flow of pressurized ambient air which is delivered through a conduit 318 into a manifold 320. A temperature sensor 383 provides a signal 385 to the control unit 379 that is indicative of the temperature of the gas within the manifold 320. The control unit 379 operates the valve 375 to introduce only such cryogen into the manifold 320 as is needed to maintain a gas temperature therein typically of about 35 degrees Fahrenheit. Gas from the manifold 320 is ducted by conduits 322, 324, 326 to valves 332, 334, 336, as indicated by arrows 342, 344, 346. The valves 332, 334, 336 operate in response to signals 352, 354, 356 that are received from a control unit 350 to deliver blowing and/or cooling gases to the mold assemblies 90, as indicated by arrows 362, 364, 366.

The system 310 of FIG. 9 represents a less preferred practice of the invention because maintaining a cooled manifold 320 tends to waste cryogen, and because the gas mixture that is contained within the manifold 320 cannot be much lower than about 35 degrees Fahrenheit without causing ice to form in the manifold 320. This temperature limitation can be overcome by drying the compressed ambient air, thereby eliminating moisture so that temperatures much lower than 35 degrees Fahrenheit can be achieved without resulting ice formations. The system of FIG. 9 is quite unlike the system 210 of FIG. 8 wherein very cold cryogen vapor is preferably ducted as directly as possible along very short flow paths into the mold assemblies 90 with minimal loss.

The system of the present invention contravenes what has long been taken for granted by those skilled in the art of molding glass articles, namely that gases which are used to effect blow molding and/or cooling of molded glass articles must not be of significantly reduced temperature if they are to perform their functions without detrimentally affecting the quality of the glass articles being molded. As those skilled in the art of glass molding are quite aware, automated machinery for molding glass containers such as bottles and the like has been in use since the early 1900's; however, to the best knowledge of the inventors hereof, during more than 8 decades of use of such automated machinery, no installation has been made wherein pressurized cold cryogen vapor has been either mixed with or substituted for blow-molding gases and/or cooling gases to provide such gases to the mold cavities of an automated molding machine with temperatures in the range of about 30 to 45 degrees Fahrenheit.

When the concept of the present invention was related to a number of persons who are acknowledged "experts" in the art of manufacturing glass containers and the like, the reception they gave this concept is one of "it can't possibly work." Stated in another way, what the present invention proposes so "flies in the face" of conventional glass molding wisdom as to be "unthinkable." However, in tests of the system of the present invention, it has been found that increases in productivity of existing automated glass-molding machinery of at least 15 percent and often more are easily attainable, and at impressively low costs.

While a press-molding operation has been depicted in FIGS. 1 through 4 for forming a preliminary glass article in the form of a hollow blank or parison 54, and whiles a blow-molding operation has been depicted in FIGS. 5 and 6 for forming the final configuration of a glass article such a bottle 100, it will be understood that these processes are conventional in nature, and that features of the present invention are not limited in application to press-molding applications, blow-molding applications, or to other conventional molding techniques that are performed singly or in any given sequence. While the practice of the invention have been illustrated in conjunction with the formation of a glass bottle, it will be understood that features of the invention are not limited to use to the formation of a particular type of glass article.

While reference has been made to "control units" 150, 250, 350, and 379 as providing valve operating signals, those skilled in the art will appreciate that the term "control unit" has been used solely for purposes of simplicity, and that any of a wide variety of conventional devices can be used to provide the described "signals." Indeed, the described signals can be provided manually, by mechanical controllers, by programmable controllers, by sensors which detect appropriate sets of conditions, and/or many other types of conventional, commercially available devices. Accordingly, no detailed description of any one type of control unit is needed to enable those skilled in the art to practice the present invention. There is no one type of controller that is considered "best."

Although the invention has been described in its preferred form with a certain degree of particularity, it will be understood that the present disclosure of the preferred form has been made only by way of example, and that numerous changes in the details of construction and the combination and arrangements of parts and the like may be resorted to without departing from the spirit and scope of the invention as hereinafter claimed. It is intended that the patent shall cover, by suitable expression in the appended claims, whatever features of patentable novelty exist in the invention disclosed.

What is claimed is:

1. In a method of making a hollow glass article by shaping a quantity of molten glass in a mold cavity, the improvement comprising the steps of providing a flow of pressurized cooling gas which has a temperature substantially below that of ambient air, and introducing the flow of cooling gas into the mold cavity interiorly with respect to the hollow glass article being formed in the cavity to directly cool interior surface portions of the molten glass therein and hasten its solidification.

2. The method of claim 1 wherein the step of providing a flow of cooling gas includes the steps of providing a source of pressurized cold cryogen vapor which has a temperature substantially below that of ambient air, providing supply means for ducting a controlled flow of cold cryogen vapor from the source into a mold cavity, and operating the supply means to duct a controlled flow of cold cryogen vapor from the source into the mold cavity to cool molten glass therein and to hasten its solidification.

3. The method of claim 1 wherein the step of providing a flow of cooling gas includes the steps of providing sequential flows of pressurized air and pressurized cold cryogen vapor which are ducted into the mold cavity one after the other to effect cooling and solidification of molten glass therein.

4. The method of claim 1 wherein the step of providing a flow of cooling gas includes the step of mixing a flow of cold cryogen vapor with a flow of ambient air to provide a flow of cooling gas having a temperature that is substantially below that of the ambient air.

5. The method of claim 4 wherein the step of mixing a flow of cold cryogen vapor with a flow of ambient air is carried out such that the flow of cooling gas that is introduced into the mold cavity has a temperature that is at least as low as about 45 degrees Fahrenheit.

6. The method of claim 4 wherein the step of providing a flow of cooling gas further includes the steps of sensing the temperature of the flow of the mixture of flows of cold cryogen vapor and pressurized air, and regulating the mixing of cold cryogen vapor and ambient air to provide a cooling gas mixture of desired temperature.

7. The method of claim 1 wherein the step of providing a flow of cooling gas includes the step of providing a controlled flow of pressurized cold cryogen vapor to form said flow of pressurized cooling gas.

8. The method of claim 1 wherein the step of providing a flow of cooling gas includes the step of sequentially supplying flows of pressurized cold cryogen vapor and pressurized air to form said flow of pressurized cooling gas.

9. A method of making a hollow glass article, including the steps of:
   (a) introducing a quantity of molten glass into a mold cavity;
   (b) conforming the quantity of molten glass to a shape defined by the mold cavity to form a hollow glass article; and
   (c) injecting a pressurized flow of cooling gas into the mold cavity interiorally with respect to the hollow glass article being formed in the cavity, with the flow of cooling gas having a temperature that is substantially below that of ambient air directly cool interior surface portions of the molten glass article therein and to hasten cooling and solidification thereof so that the glass article will solidify rapidly and can therefore be removed quickly from the mold cavity.

10. The method of claim 9 wherein the step of conforming a quantity of molten glass to a shape defined by the mold includes the step of introducing into the mold cavity a flow of pressurized blowing gas which has a temperature substantially below that of ambient air, whereby the pressurized blowing gas at least assists in effecting the desired conformation of the molten glass to the configuration of the mold, and simultaneously assists in cooling the quantity of molten glass.

11. The method of claim 10 wherein the step of introducing a flow of blowing gas into the mold cavity includes the step of providing a controlled flow of pressurized cold cryogen vapor to form said flow of pressurized gas.

12. The method of claim 10 wherein the step of introducing a flow of blowing gas into the mold cavity includes the step of mixing a flow of pressurized cold cryogen vapor with a flow of pressurized ambient air to provide a flow of pressurized blowing gas of a predetermined temperature that is substantially below that of ambient air.

13. The method of claim 12 wherein the step of mixing a flow of cryogen vapor with a flow of ambient air is carried out such that the blowing gas which is introduced into the mold cavity has a temperature that is at least as low as about 45 degrees Fahrenheit.

14. The method of claim 12 wherein the step of providing a flow of pressurized cooling gas further includes the steps of sensing the temperature of the flow of the mixture of flows of pressurized cold cryogen vapor and pressurized ambient air, and regulating the mixing of the flows of cold cryogen vapor and ambient air to provide a cooling gas mixture of desired temperature.

15. In a hollow glass article manufacturing machine including a mold having a cavity into which a quantity of molten glass is introduced to be conformed to a desired shape as defined by the mold cavity, and having gas inlet means for admitting a flow of blowing gas to the mold cavity interiorally with respect to the hollow glass article being formed in the cavity to directly cool interior surface portions of the molten glass therein for at least assisting in conforming a quantity of molten glass to a desired configuration defined by the mold cavity, the improvement of means for providing a flow of pressurized cold cryogen vapor to form at least a portion of a flow of pressurized blowing gas that has a temperature substantially below that of ambient air, and means for supplying the flow of pressurized blowing gas to the gas inlet means.

16. The machine of claim 15 additionally including flow control means for providing a flow of cooling gas comprising cold cryogen vapor through the mold cavity and through the interior of the hollow glass article after the molten glass has been conformed to the desired configuration to effect further cooling of the molded glass article and to further hasten its solidification.

* * * * *